(12) United States Patent
Zheng et al.

(10) Patent No.: US 12,671,035 B2
(45) Date of Patent: Jun. 30, 2026

(54) HIGHLY RELIABLE MULTILAYER CERAMIC THROUGH-HOLE CAPACITOR AND MANUFACTURING METHOD THEREOF

(71) Applicant: FUJIAN OUZHONG ELECTRONICS CO., LTD, Fuzhou (CN)

(72) Inventors: Chaoyong Zheng, Fuzhou (CN); Bin Ye, Fuzhou (CN)

(73) Assignee: FUJIAN OUZHONG ELECTRONICS CO., LTD, Suzhou (CN)

( * ) Notice: Subject to any disclaimer, the term of this patent is extended or adjusted under 35 U.S.C. 154(b) by 425 days.

(21) Appl. No.: 18/264,801

(22) PCT Filed: Apr. 12, 2021

(86) PCT No.: PCT/CN2021/086429
§ 371 (c)(1),
(2) Date: Aug. 9, 2023

(87) PCT Pub. No.: WO2022/170674
PCT Pub. Date: Aug. 18, 2022

(65) Prior Publication Data
US 2024/0055189 A1     Feb. 15, 2024

(30) Foreign Application Priority Data
Feb. 9, 2021     (CN) .......................... 202110177747.4

(51) Int. Cl.
*H01G 4/35*     (2006.01)
*H01G 4/12*     (2006.01)
*H01G 4/30*     (2006.01)

(52) U.S. Cl.
CPC .................. *H01G 4/35* (2013.01); *H01G 4/30* (2013.01); *H01G 4/12* (2013.01)

(58) Field of Classification Search
CPC ............... H01G 4/30; H01G 4/12; H01G 4/35
USPC ................................... 361/302, 321.1, 301.4
See application file for complete search history.

(56) References Cited

U.S. PATENT DOCUMENTS

2020/0203881 A1* 6/2020 Marzano ................ H01G 4/232
2020/0343046 A1* 10/2020 Hodgkinson ............ H01G 4/30

FOREIGN PATENT DOCUMENTS

CN     111807854 A  * 10/2020  ............. H03H 3/007
CN     211879241 U  * 11/2020  ............... H01G 9/10

* cited by examiner

*Primary Examiner* — Arun Ramaswamy
(74) *Attorney, Agent, or Firm* — Westbridge IP LLC

(57) ABSTRACT
Disclosed is a highly reliable multilayer ceramic through-hole capacitor. It includes a multilayer ceramic through-hole capacitor body, which has at least one inner hole for inserting a first controlled expansion alloy tube. A guide pin is inserted into the first controlled expansion alloy tube, which undergoes annealing and surface electroplating treatment. The guide pin, first controlled expansion alloy tube, and inner hole are all fixed using lead-free solder. By welding the first controlled expansion alloy tube with the inner hole of the disk-shaped multilayer ceramic capacitor, the stress resistance capability of the capacitor is improved. This eliminates the need for lead-containing soldering materials with high ductility in the production process, allowing the capacitor to withstand multiple temperature changes without ceramic cracking. As a result, the multilayer ceramic through-hole capacitor achieves high reliability even in harsh external environments.

16 Claims, 4 Drawing Sheets

21

21

6

HIGHLY RELIABLE MULTILAYER CERAMIC THROUGH-HOLE CAPACITOR AND MANUFACTURING METHOD THEREOF

CROSS-REFERENCE TO RELATED APPLICATIONS

This application is a national stage of International Application No. PCT/CN2021/086429, filed on Apr. 12, 2021, which claims priority to Chinese Patent Application No. 202110177747.4, filed on Feb. 9, 2021. All of the aforementioned applications are incorporated herein by reference in their entireties.

TECHNICAL FIELD

The present application relates to the field of capacitor technology, particularly to a highly reliable multilayer ceramic through-hole capacitor and its manufacturing method.

BACKGROUND

Multilayer ceramic through-hole capacitor is based on the technology of multilayer ceramic capacitor (MLCC) but with some internal structural changes. They are manufactured similarly to MLCC, as the layers of ceramic dielectric material and precious metal electrodes are interleaved and formed into a cohesive structure. Then, holes are drilled in the ceramic body to form contacts with the internal or external electrodes. The capacitance is formed between the holes and the outer edges. In the case of a planar array, the capacitance is formed between each hole and the outer edges. The capacitance characteristics of each hole may differ within certain limits.

The single-hole device is commonly referred to as a "disk", while the multi-hole device is called a planar array. The manufacturing process for a disk-shaped multilayer ceramic capacitor with a single hole is roughly as follows: preparation of ceramic slurry, tape casting, screen printing, lamination, shaping, high-temperature sintering, terminal sealing, burnishing, and surface treatment. After a series of processes, a disk-shaped multilayer ceramic capacitor composed of a ferroelectric ceramic body and metal electrodes is formed. The materials commonly used are $BaTiO_3$ ceramic dielectric and PdAg or Ni internal electrodes. The structural interface of a typical disk-shaped multilayer ceramic capacitor is shown in FIG. 1, which includes a ferroelectric ceramic body 21, inner and outer metal electrodes 22, and a central inner hole 6 for fixing the guide pin.

The completed capacitor device is used for assembling anti-electromagnetic interference filter and filter assembly components. Compared to surface-mounted chip filters, their special structure gives them superior high-frequency performance. This is particularly important for applications such as military, aviation, and medical. When manufacturing an anti-electromagnetic interference filter, the disk-shaped product or array product is welded into a carrying can or carrier, and a pin is welded through the center. The assembly can then be sealed for improved mechanical and environmental protection. When the filter signal passes through the pin, the filter body is grounded externally. The pin and filter body are typically made of copper or copper alloy and plated with nickel, silver, or gold. A typical structure of an anti-electromagnetic interference filter, as described in FIG. 2, includes a disk-shaped multilayer ceramic capacitor 23, a center pin 24, solder 25 used for welding, an outer metal shell 26, and epoxy resin 27 for overall external sealing.

Over the years, it has been recognized that welding copper pins or copper alloy pins to the inner holes of disk-shaped ceramic capacitors may induce cracks in the ceramic structure. The cracks generated during this process are known as "long-bow cracks" or "comma cracks" because they have distinct shapes when observed from the side cross-section or top cross-section.

These cracks can be benign but can also lead to complete electrical failures depending on whether they pass through the electrode coverage area. Of more significant concern is that cracks may be generated during welding but only propagate during further processing or use, leading to failures in the operation of the capacitor.

Capacitor failures always tend to be short circuits. If the power supply is strong enough, the component becomes very hot and can become a source of combustion.

The materials used for ceramics and pins are typically certain and cannot be changed. Therefore, through continuous experimentation in existing techniques, it has been found that the use of high-lead solder can effectively avoid the generation of welding cracks. Commonly used high-lead solders include 50Pb/50In, 95Pb/5In, and 93.5Pb/5Sn/1.5Ag. The use of high-lead solder is due to its high ductility, which prevents excessive force from being transferred to the ceramic dielectric material, thereby avoiding the generation of cracks in the short term. Although high-ductility solder materials with high lead content have been used, cracks of varying degrees can occur in the ferroelectric ceramic body of the disk-shaped multilayer ceramic capacitor after multiple temperature shocks of rapid changes between high and low temperatures or under harsh external environmental conditions. Cracks are more likely to occur at the junction of the holes and pins. At the same time, the use of high-lead solder is detrimental to the lead-free process of electronic products and causes serious environmental pollution.

Therefore, the use of lead-free solder and ensuring the absence of cracks during the welding of multilayer ceramic through-hole capacitors, as well as reliability under harsh external environmental conditions, is a pressing technical problem that needs to be addressed.

SUMMARY

The purpose of the present application is to overcome the drawbacks of the prior art and provide a low-cost, crack-free, and highly reliable multilayer ceramic through-hole capacitor and its manufacturing method.

The present application is achieved by the following means: a highly reliable multilayer ceramic through-hole capacitor comprises a multilayer ceramic through-hole capacitor body, which has at least one inner hole; a guide pin is provided inside the inner hole, and the side wall of the inner hole is connected with a first controlled expansion alloy tube; the first controlled expansion alloy tube needs to undergo annealing and surface electroplating treatment.

Furthermore, the guide pin is inserted in the first controlled expansion alloy tube; the guide pin and the first controlled expansion alloy tube are fixed by lead-free solder; the first controlled expansion alloy tube is fixed to the inner hole either by lead-free solder or by direct sintering.

Furthermore, the first controlled expansion alloy tube is seamless; the two ends of the controlled expansion alloy tube extend respectively out of the inner hole of the multilayer ceramic through-hole capacitor body.

Furthermore, the surface electroplating of the first controlled expansion alloy tube consists of a single layer or a composite layer composed of copper plating, nickel plating, silver plating, gold plating, tin plating, or tin-lead plating.

Furthermore, the multilayer ceramic through-hole capacitor body is a disk-shaped multilayer ceramic through-hole capacitor, and the center of the capacitor body has an inner hole for inserting a first controlled expansion alloy tube. A second controlled expansion alloy tube is welded to the periphery of the multilayer ceramic through-hole capacitor body using solder.

Furthermore, the multilayer ceramic through-hole capacitor body is a planar array capacitor, and the center of the capacitor body has several inner holes arranged in a matrix. The inner holes are inserted with a first controlled expansion alloy tube, and the first controlled expansion alloy tube is provided with a guide pin.

A method for manufacturing a highly reliable multilayer ceramic through-hole capacitor includes the following steps:

S1: selecting a controlled expansion alloy tube with a diameter slightly smaller than the inner hole; the controlled expansion alloy tube is seamless;

S2: cutting the controlled expansion alloy tube into a length equivalent to the thickness of the multilayer ceramic through-hole capacitor body;

S3: removing burrs from the cut controlled expansion alloy tube;

S4: vacuum annealing the deburred controlled expansion alloy tube to eliminate mechanical processing stress and work hardening;

S5: electroplating the annealed controlled expansion alloy tube on the inner and outer surfaces to prepare the first controlled expansion alloy tube;

S6: installing the first controlled expansion alloy tube through a fixture into the inner hole of the multilayer ceramic through-hole capacitor body, a guide pin is inserted into the inner hole; the multilayer ceramic through-hole capacitor body is a disk-shaped multilayer ceramic through-hole capacitor or a planar array capacitor;

S7: adding solder between the guide pin and the first controlled expansion alloy tube, and between the first controlled expansion alloy tube and the inner hole for welding;

S8: finally, cleaning and drying the soldered product. Products with a metal shell also need to be sealed and cured.

Furthermore, the vacuum annealing process involves heating the material in a hydrogen atmosphere to 900° C.±50° C., maintaining it for 1-2 hours, and then cooling it to below 200° C. at a rate not exceeding 5° C./min.

Furthermore, the first controlled expansion alloy tube can be made of an alloy from iron-nickel, iron-nickel-cobalt, or iron-nickel-chromium.

Furthermore, the second controlled expansion alloy tube is fitted on the outer periphery of the disk-shaped multilayer ceramic through-hole capacitor and has a size matching the capacitor. The second controlled expansion alloy tube can be made of an alloy from iron-nickel, iron-nickel-cobalt, or iron-nickel-chromium.

Furthermore, the multilayer ceramic through-hole capacitor is placed inside a metal shell and sealed to prepare an anti-electromagnetic interference filter.

The beneficial effects of the present application are as follows: a first controlled expansion alloy tube is welded to the inner hole of the disc-shaped multilayer ceramic through-hole capacitor, or both the inner hole and the outer ring, to enhance the stress resistance ability of the disk-shaped multilayer ceramic through-hole capacitor. This allows the welding material used for the production of multilayer ceramic through-hole capacitors to be not limited to lead-containing and highly ductile welding materials and can withstand many rapidly changing temperature shocks of high and low temperature without failure even when the ductility of the welding material used is poor. As a result, highly reliable multilayer ceramic through-hole capacitors can be obtained. By adding the first controlled expansion alloy tube, the excessive stress is prevented from directly transferring to the ceramic dielectric material, and the spacing can effectively reduce the direct transfer of stress during thermal expansion and contraction. At the same time, by adding the first controlled expansion alloy tube, the amount of welding material used is reduced, reducing the demand for high ductility of the welding material. The first controlled expansion alloy tube has a similar expansion coefficient to the ceramic, thereby avoiding the generation of cracks in harsh environments of thermal cycling, further improving the reliability of the capacitor.

BRIEF DESCRIPTION OF THE DRAWINGS

To illustrate the technical solutions of the embodiments of the present application more clearly, the accompanying drawings required for the embodiments will be briefly described below. It should be understood that the following drawings only illustrate certain exemplary embodiments of the present application and should not be seen as limiting the scope of the application. Ordinarily, skilled artisans in the art can obtain other relevant drawings based on these drawings without exercising inventive labor.

DETAILED DESCRIPTION OF THE EMBODIMENTS

Figure 1:
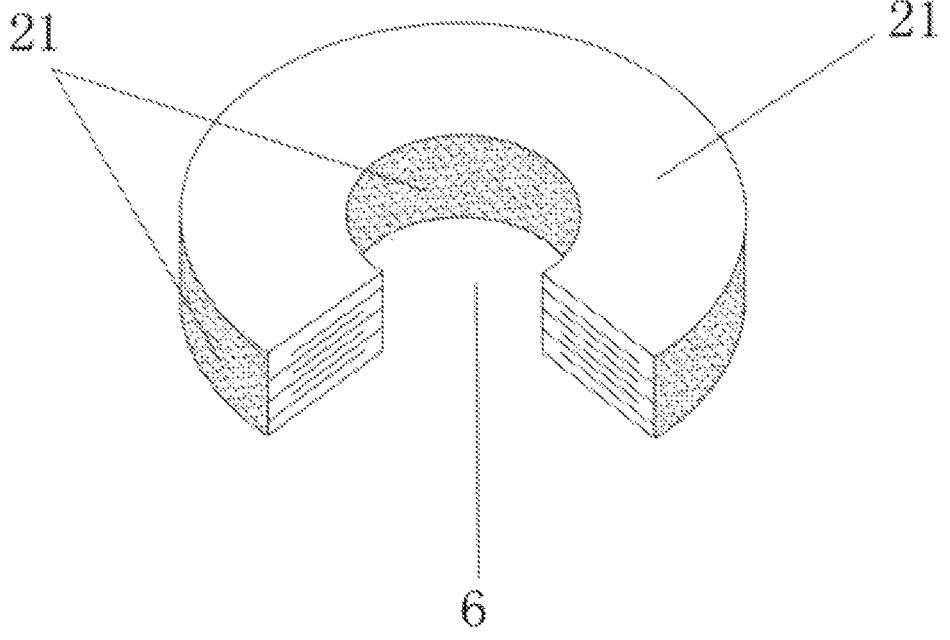
FIG. 1 is a cross-sectional view of a typical disk-shaped multilayer ceramic capacitor.
Figure 2:
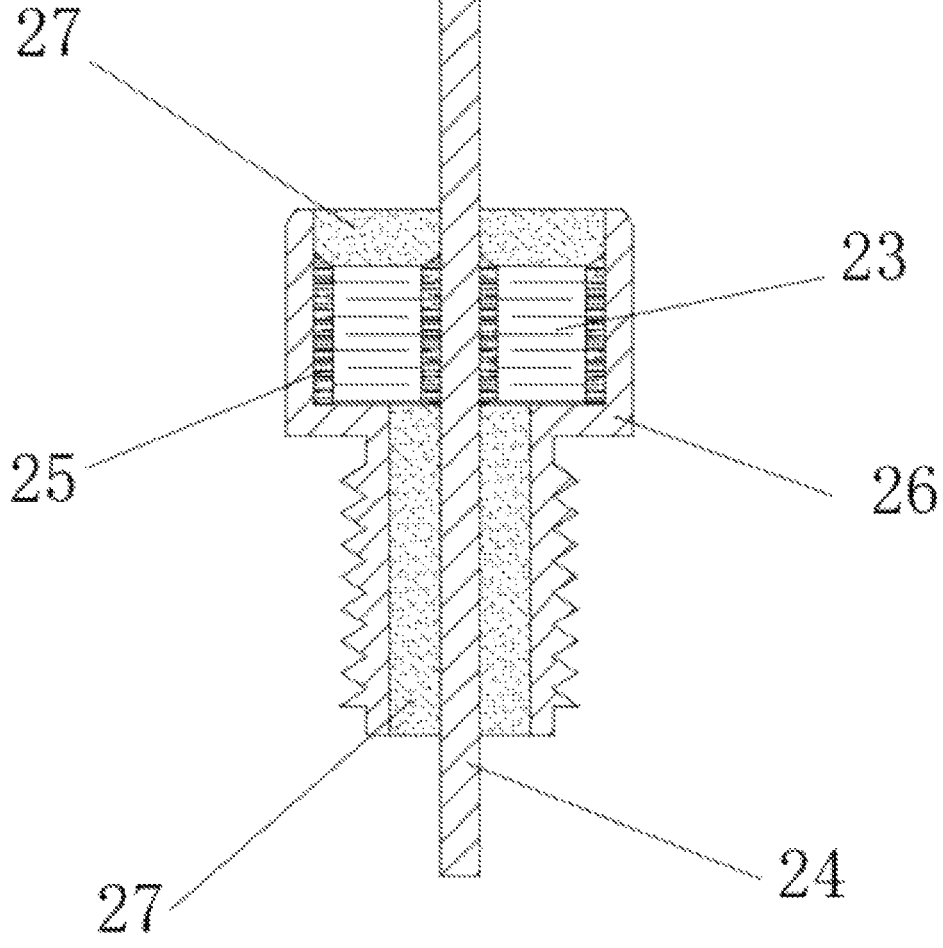
FIG. 2 is a typical structure of an anti-electromagnetic interference filter.

To make the objectives, technical solutions, and advantages of the embodiments of the present application clearer and more understandable, the technical solutions in the embodiments of the present application will be described clearly and completely in conjunction with the accompanying drawings. The described embodiments are only part of the embodiments of the present application and not all embodiments. Based on the embodiments of the present application, all other embodiments obtained by ordinary skilled artisans in the art without exercising inventive labor are within the scope of protection of the present application. Therefore, the detailed description of the embodiments of the present application provided in the accompanying drawings is not intended to limit the scope of the claimed application but is merely representative of selected embodiments of the present application. Based on the embodiments of the present application, all other embodiments obtained by ordinary skilled artisans in the art without exercising inventive labor are within the scope of protection of the present application.

In the description of the present application, it should be noted that the terms "upper," "lower," "inner," "outer," "front end," "rear end," "both ends," "one end," "the other end," and the like indicating positional relationships or orientations are based on the positional relationships or orientations shown in the drawings, and are only used for the convenience of describing and simplifying the description of the present application, and do not indicate or imply that the devices or components referred to must have specific orientations or be constructed and operated in specific orientations, and therefore should not be interpreted as limiting the present application. In addition, the terms "first," "second," and the like are used for descriptive purposes only and should not be construed as indicating or implying relative importance.

In the description of the present application, it should be noted that unless otherwise expressly specified and limited, terms such as "mounted," "provided with," "connected," etc., should be broadly understood. For example, "connected" can refer to fixed connection or detachable connection, a mechanical connection or electrical connection, a direct connection or indirect connection through an intermediate medium, or an internal connection between two components. Ordinarily, skilled artisans in the art can understand the specific meanings of the above terms in the present application based on specific circumstances.

Embodiment 1

Figure 3:
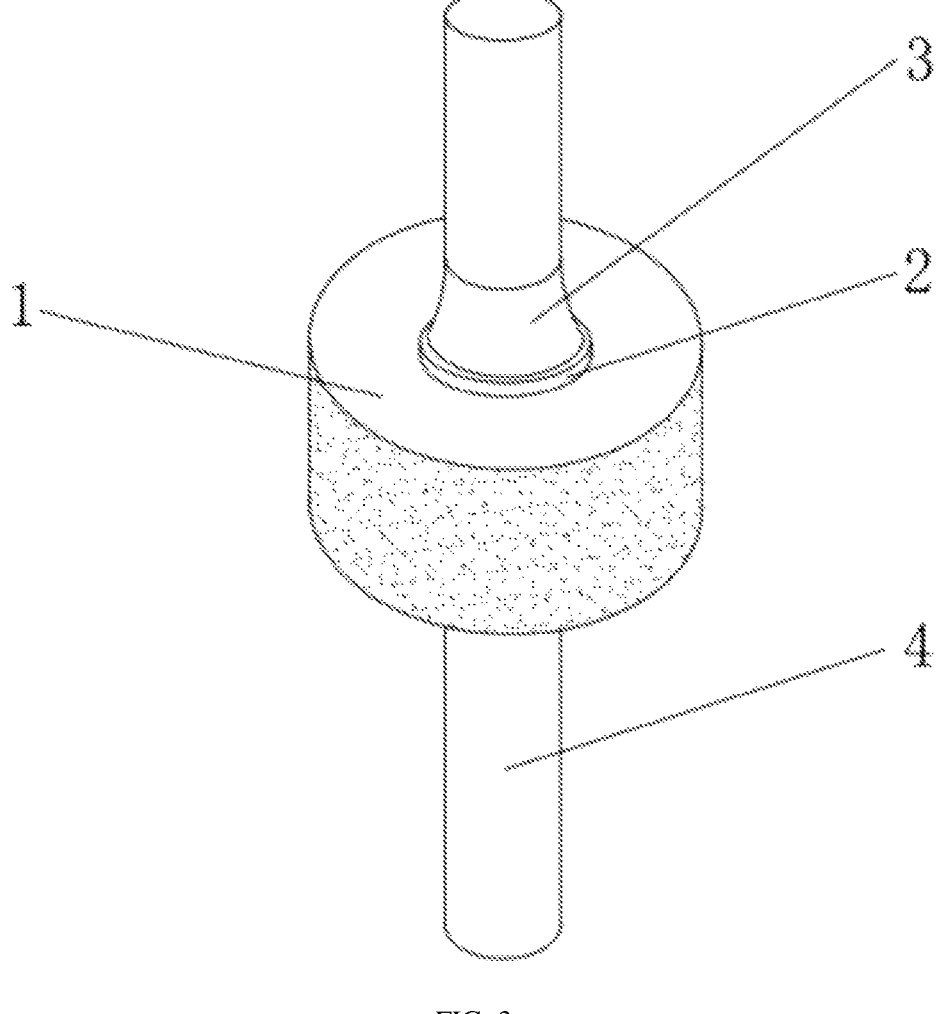
FIG. 3 is a structure of a multilayer ceramic through-hole capacitor according to the present application.

As shown in FIG. 3, a highly reliable multilayer ceramic through-hole capacitor includes a multilayer ceramic through-hole capacitor body 1. The multilayer ceramic through-hole capacitor body 1 has an inner hole for inserting a first controlled expansion alloy tube 2. A guide pin 4 is inserted inside the first controlled expansion alloy tube 2. The first controlled expansion alloy tube 2 undergoes surface electroplating treatment after vacuum annealing. The guide pin 4 and the first controlled expansion alloy tube, the first controlled expansion alloy tube, and the inner hole are welded and fixed by lead-free solder 3.

In this embodiment, the first controlled expansion alloy tube 2 is seamless; the two ends of the controlled expansion alloy tube 2 extend respectively out of the inner hole of the multilayer ceramic through-hole capacitor body 1.

In this embodiment, the surface electroplating of the first controlled expansion alloy tube 2 is copper plating.

In this embodiment, the vacuum annealing process involves heating the material in a hydrogen atmosphere to 900° C.±50° C., holding it for 1-2 hours, and cooling it to below 200° C. at a rate not exceeding 5° C./min before furnace removal.

In this embodiment, the first controlled expansion alloy tube 2 is made of iron-nickel alloy.

Embodiment 2

Figure 4:
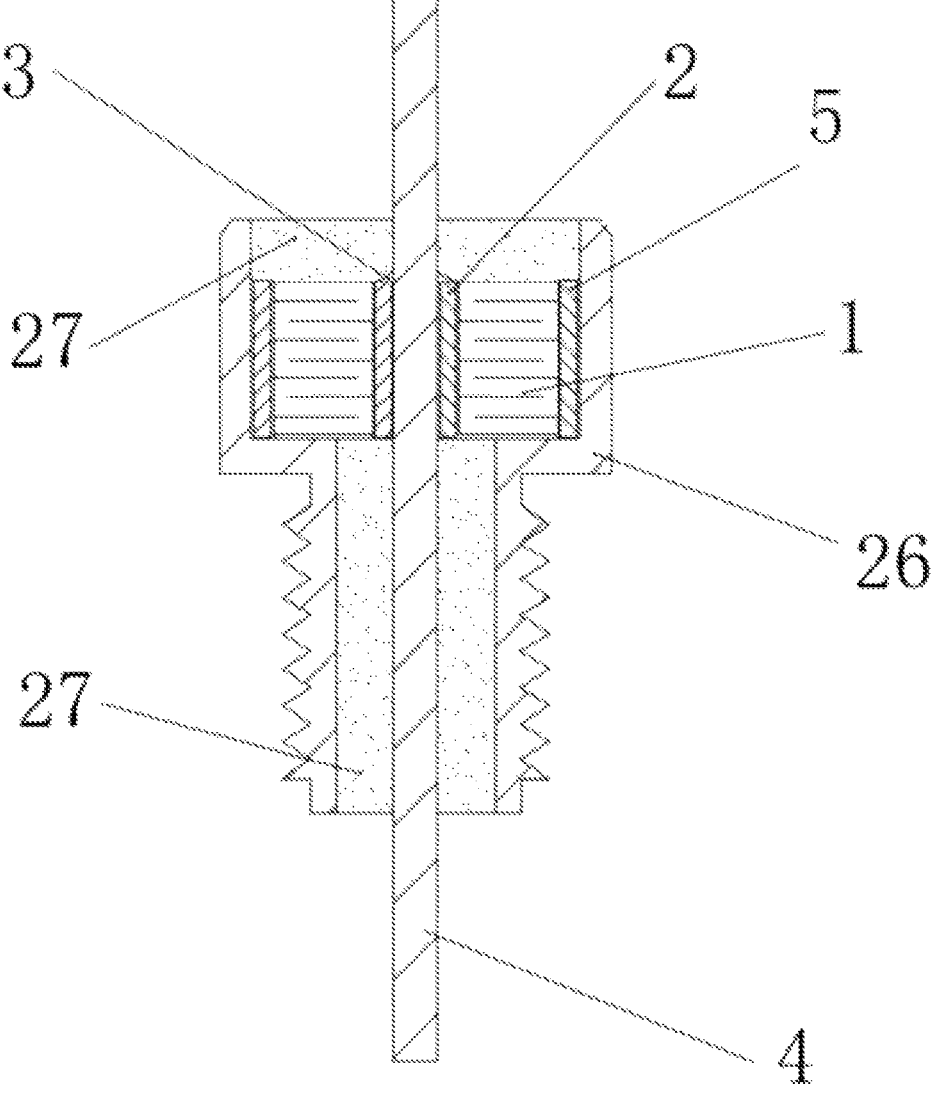
FIG. 4 is a structure of an anti-electromagnetic interference filter prepared using the multilayer ceramic through-hole capacitor according to the present application.

As shown in FIG. 4, a highly reliable multilayer ceramic through-hole capacitor includes a multilayer ceramic through-hole capacitor body 1. The multilayer ceramic through-hole capacitor body 1 is a disk-shaped multilayer ceramic through-hole capacitor. The multilayer ceramic through-hole capacitor body 1 has an inner hole for inserting a first controlled expansion alloy tube 2. A second controlled expansion alloy tube 5 is welded to the periphery of the multilayer ceramic through-hole capacitor body 1 using solder. The first controlled expansion alloy tube 2 has a guide pin 4 inserted inside. The first controlled expansion alloy tube 2 undergoes surface electroplating treatment after vacuum annealing. The guide pin 4 and the first controlled expansion alloy tube, the first controlled expansion alloy tube, and the inner hole are welded and fixed by lead-free solder 3.

In this embodiment, the first controlled expansion alloy tube 2 is seamless; the two ends of the controlled expansion alloy tube 2 extend respectively out of the inner hole of the multilayer ceramic through-hole capacitor body 1.

In this embodiment, the surface electroplating of the first controlled expansion alloy tube 2 is gold plating.

In this embodiment, the vacuum annealing process involves heating the material in a hydrogen atmosphere to 900° C.±50° C., holding it for 1-2 hours, and cooling it to below 200° C. at a rate not exceeding 5° C./min before furnace removal.

In this embodiment, the first controlled expansion alloy tube 2 is made of iron-nickel alloy.

The second controlled expansion alloy tube 5 is installed on the outer periphery of the disc-shaped multilayer ceramic through-hole capacitor and matches its size. The second controlled expansion alloy tube 5 is made of iron-nickel alloy.

In this embodiment, the multilayer ceramic through-hole capacitor is externally equipped with a metal shell 26. The second controlled expansion alloy tube 5 is soldered to the metal shell 26 to form an anti-electromagnetic interference filter.

Embodiment 3

As shown in FIG. 3, a highly reliable multilayer ceramic through-hole capacitor includes a multilayer ceramic through-hole capacitor body 1. The multilayer ceramic through-hole capacitor body 1 has an inner hole for inserting a first controlled expansion alloy tube 2. A guide pin 4 is inserted inside the first controlled expansion alloy tube 2. The first controlled expansion alloy tube 2 undergoes surface electroplating treatment after vacuum annealing. The guide pin 4 and the first controlled expansion alloy tube 2 are welded and fixed using lead-free solder 3; the first controlled expansion alloy tube 2 is directly sintered and fixed with the inner hole.

In an embodiment of the present application, a method for manufacturing a highly reliable multilayer ceramic through-hole capacitor includes the following steps:

S1: Select a controlled expansion alloy tube with a diameter slightly smaller than the inner hole. The controlled expansion alloy tube is seamless.

S2: Cut the controlled expansion alloy tube into a length equivalent to the thickness of the multilayer ceramic through-hole capacitor body.

S3: Remove burrs from the cut controlled expansion alloy tube.

S4: Vacuum anneal the deburred controlled expansion alloy tube to eliminate mechanical processing stress and work hardening.

S5: Electroplate the annealed controlled expansion alloy tube on the inner and outer surfaces to prepare the first controlled expansion alloy tube.

S6: Install the first controlled expansion alloy tube through a fixture into the inner hole of the multilayer ceramic through-hole capacitor body. A guide pin is inserted into the inner hole. The multilayer ceramic through-hole capacitor body can be a disk-shaped multilayer ceramic through-hole capacitor or a planar array capacitor.

S7: solder is added between the guide pin and the first controlled expansion alloy tube, and between the first controlled expansion alloy tube and the inner hole for welding.

S8: Finally, clean and dry the soldered product. Products with a metal shell also need to be sealed and cured.

Experimental Example 1

An array is assembled using a 62Sn/36Pb/2Ag solder and subjected to reflow using a 5-zone hot air reflow oven. As the array passes through the final soldering zone, some pins are removed. After cleaning and drying, the array is cross-sectioned for internal structure analysis. It is found that cracks are observed around the holes where the guide pins are still in place. In areas where the guide pins have been removed, no "long-bow cracks" are present.

This indicates that the cracks only occur during the cooling stage of the soldering process, and the presence of the guide pins is necessary to generate the stress that leads to the formation of long-bow cracks. This suggests that the stress applied to the capacitor is external and originates from the soldering process.

Considering the stress generated during the cooling cycle, it is evident that the decisive stress is caused by the shrinkage of the solder/guide pins during cooling. This force arises from the mismatch in shrinkage between the ceramic/solder/guide pins. To prevent cracking, it is necessary to modify the nature of this connection. In environments with alternating thermal cycles, these changes will be more pronounced, and the probability of crack formation will be further increased.

Experimental Example 2

To analyze the effects of different solder alloys, a set of experiments is conducted using the following alloys:

| | |
|---|---|
| 62Sn/36Pb/2Ag | traditional low melting point solder |
| 60Sn/40Pb | traditional solder |
| 99.3Sn/0.7Cu | lead-free solder |
| 95.5Sn/3.8Ag/0.7Cu | recommended lead-free solder for circuit board assembly, |
| 50Pb/50In | ductility stress-reducing solder |
| 95Pb/5In | ductility stress-reducing high melting point solder |
| 93.5Pb/5Sn/1.5Ag | ductility stress-reducing high melting point solder |

This matrix represents examples of solder alloys currently used for assembling filters for electromagnetic interference suppression, conventional tin-lead solder, and lead-free alternative solder.

In each solder case, two sets of filter samples are assembled, except for the two high melting point alloys, and subjected to reflow using a 5-zone hot air reflow oven. Sample Set 1 is force-cooled using a blower after Zone 5, following the standard soldering profile. Sample Set 2 is subjected to the same soldering profile but with the blower turned off during cooling to gradually reduce the stress on the ceramic body.

The 95Pb/5Sn solder has a high melting point of 300° C./313° C., and the 93.5Pb/5In/1.5Ag solder also has a high melting point of 296° C./301° C. Therefore, both of them cannot be soldered using a hot air oven. These samples were assembled using a hot plate at 425° C. No preheating is applied. The parts of Sample Set 1 are force-cooled directly in front of a fan. The parts of Sample Set 2 are gradually cooled.

After keeping the samples from Sample Set 1 and Sample Set 2 in a test chamber at −55° C. for 15 minutes, the test samples were moved to a test chamber at +125° C. and kept for 15 minutes before transferring them back in the low-temperature chamber. The transition time from low temperature to high temperature or high temperature to low temperature did not exceed 5 minutes, constituting one cycle.

Then, the samples are cross-sectioned to examine the capacitor structure around the solder joints for crack detection.

The results are as follows:

1. Solder Alloy: 62Sn/36Pb/2Ag

1. A. 62Sn/36Pb/2Ag Sample 1 (Force-cooled)

80% of the cross-sectioned joints exhibit long-bow cracks near the solder joints. All examined joints have some cracking in the ceramic body, mostly corner cracks.

1. B. 62Sn/36Pb/2Ag Sample 2 (Gradually cooled)

20% of the cross-sectioned joints exhibit long-bow cracks near the solder joints. A total of 60% of the joints have corner cracks associated with the solder fillet.

2. Solder Alloy: 60Sn/40Pb

2. A. 60Sn/40Pb Sample 1 (Force-cooled)

All cross-sectioned joints exhibit long-bow cracks near the solder joints. All joints also have corner cracks.

2. B. 60Sn/40Pb Sample 2 (Gradually cooled)

60% of the cross-sectioned joints exhibit long-bow cracks near the solder joints. A total of 80% of the joints have corner cracks associated with the solder fillet.

3. Solder Alloy: 99.3Sn/0.7Cu

3. A. 99.3Sn/0.7Cu Sample 1 (Force-cooled)

All cross-sectioned joints exhibit long-bow cracks near the solder joints. All joints also have corner cracks.

3. B. 99.3Sn/0.7Cu Sample 2 (Gradually cooled)

All cross-sectioned joints exhibit long-bow cracks near the solder joints. All joints also have corner cracks.

4. Solder Alloy: 95.5Sn/3.8Ag/0.7Cu

4. A. 95.5Sn/3.8Ag/0.7Cu Sample 1 (Force-cooled)

All cross-sectioned joints exhibit long-bow cracks near the solder joints. All joints also have corner cracks.

4. B. 95.5Sn/3.8Ag/0.7Cu Sample 2 (Gradually cooled)

40% of the cross-sectioned joints exhibit long-bow cracks near the solder joints. A total of 80% of the joints have corner cracks, mainly associated with the corner cracks related to the solder pad.

5. Solder Alloy: 50In/50Pb

5. A. 50Pb/50In Sample 1 (Force-cooled)

No evidence of induced cracking in the ceramic body is observed in all cross-sectioned joints.

5. B. 50Pb/50In Sample 2 (Gradually cooled)

No evidence of induced cracking in the ceramic body is observed in all cross-sectioned joints.

6. Solder Alloy: 95Pb/5In

6. A. 95Pb/5In Sample 1 (Force-cooled)

No evidence of induced cracking in the ceramic body is observed in all cross-sectioned joints.

6. B. 95Pb/5In Sample 2 (Gradually cooled)

No evidence of induced cracking in the ceramic body is observed in all cross-sectioned joints.

7. Solder Alloy: 93.5Pb/5Sn/1.5Ag

7. A. 93.5Pb/5Sn/1.5Ag Sample 1 (Force-cooled)

10% of the examined joints exhibit very small long-bow cracks near the solder joints.

These cracks are noticeably smaller than those observed in other samples.

7. B. 93.5Pb/5Sn/1.5Ag Sample 2 (Gradually cooled)

No evidence of induced cracking in the ceramic body is observed in all cross-sectioned joints.

Summary of Results

| Serial number | Alloy varieties | Cooling method | Defect rate (%) without temperature shock | Defect rate (%) after 100 temperature shocks from −55° C. to 125° C. | Defect rate (%) after 20 temperature shocks from −55° C. to 125° C. |
|---|---|---|---|---|---|
| 1 | 62Sn/36Pb/2Ag | Force | 100 | 100 | 100 |
| | | Gradually | 60 | 100 | 100 |
| 2 | 60Sn/40Pb | Force | 100 | 100 | 100 |
| | | Gradually | 80 | 100 | 100 |
| 3 | 99.3Sn/0.7Cu | Force | 100 | 100 | 100 |
| | | Gradually | 100 | 100 | 100 |
| 4 | 95.5Sn/3.8Ag/0.7Cu | Force | 100 | 100 | 100 |
| | | Gradually | 80 | 100 | 100 |
| 5 | 50Pb/50In | Force | 0 | 100 | 100 |
| | | Gradually | 0 | 100 | 100 |
| 6 | 95Pb/5In | Force | 0 | 80 | 100 |
| | | Gradually | 0 | 50 | 100 |
| 7 | 93.5Pb/5Sn/1.5Ag | Force | 10 | 100 | 100 |
| | | Gradually | 0 | 70 | 100 |

The present application involves welding a tube made of an expandable alloy to the inner hole of a disc-shaped multilayer ceramic capacitor.

Experimental Example 3

To analyze the effects of different solder alloys, a set of experiments is conducted using the following alloys:

| | |
|---|---|
| 62Sn/36Pb/2Ag | traditional low melting point solder |
| 60Sn/40Pb | traditional solder |
| 99.3Sn/0.7Cu | lead-free solder |
| 95.5Sn/3.8Ag/0.7Cu | recommended lead-free solder for circuit board assembly, |
| 50Pb/50In | ductility stress-reducing solder |
| 95Pb/5In | ductility stress-reducing high melting point solder |
| 93.5Pb/5Sn/1.5Ag | ductility stress-reducing high melting point solder |

Except for two high melting point alloys, two sets of filter samples are assembled for each solder case. The multilayer ceramic capacitors inside the filters are welded using the structure of Example 1, but the lead-free solder is replaced with different solders required for the experiment. Reflow soldering is carried out using a 5-zone hot air reflow oven. Sample set 1 is forcefully cooled using a fan after the 5th zone, following the standard soldering curve. Sample set 2 undergoes the same reflow soldering curve but the fan for cooling is turned off, allowing it to gradually cool down to reduce stress on the ceramic.

The 95Pb/5In solder alloy has a high melting point of 300° C./313° C., and the 93.5Pb/5In/1.5Ag alloy also has a high melting point of 296° C./301° C. Therefore, neither of them can be soldered using a hot air oven. These samples are assembled using a hot plate at 425° C. without preheating. The parts of Sample Set 1 are directly cooled using a desk fan. The parts of Sample Set 2 are gradually cooled.

After the samples from both sets are kept in a test chamber at −55° C. for 15 minutes, they are then transferred to another test chamber at +125° C. and kept for 15 minutes before being moved back to the low-temperature chamber. The transfer time from low temperature to high temperature or vice versa does not exceed 5 minutes, constituting one cycle.

Subsequently, the samples are cross-sectioned to examine the capacitor structure around the solder joints to look for any cracks.

The results are as follows:

1. Solder Alloy: 62Sn/36Pb/2Ag

1. A. 62Sn/36Pb/2Ag Sample 1 (Force-cooled)

No evidence of induced cracking in the ceramic body is observed in all cross-sectioned joints.

1. B. 62Sn/36Pb/2Ag Sample 2 (Gradually cooled)

No evidence of induced cracking in the ceramic body is observed in all cross-sectioned joints.

2. Solder Alloy: 60Sn/40Pb

2. A. 60Sn/40Pb Sample 1 (Force-cooled)

No evidence of induced cracking in the ceramic body is observed in all cross-sectioned joints.

2. B. 60Sn/40Pb Sample 2 (Gradually cooled)

No evidence of induced cracking in the ceramic body is observed in all cross-sectioned joints.

3. Solder Alloy: 99.3Sn/0.7Cu

3. A. 99.3Sn/0.7Cu Sample 1 (Force-cooled)

No evidence of induced cracking in the ceramic body is observed in all cross-sectioned joints.

3. B. 99.3Sn/0.7Cu Sample 2 (Gradually cooled)

No evidence of induced cracking in the ceramic body is observed in all cross-sectioned joints.

4. Solder Alloy: 95.5Sn/3.8Ag/0.7Cu

4. A. 95.5Sn/3.8Ag/0.7Cu Sample 1 (Force-cooled)

No evidence of induced cracking in the ceramic body is observed in all cross-sectioned joints.

4. B. 95.5Sn/3.8Ag/0.7Cu Sample 2 (Gradually cooled)

No evidence of induced cracking in the ceramic body is observed in all cross-sectioned joints.

5. Solder Alloy: 50In/50Pb

5. A. 50Pb/50In Sample 1 (Force-cooled)

No evidence of induced cracking in the ceramic body is observed in all cross-sectioned joints.

5. B. 50Pb/50In Sample 2 (Gradually cooled)

No evidence of induced cracking in the ceramic body is observed in all cross-sectioned joints.

6. Solder Alloy: 95Pb/5In

6. A. 95Pb/5In Sample 1 (Force-cooled)

No evidence of induced cracking in the ceramic body is observed in all cross-sectioned joints.

6. B. 95Pb/5In Sample 2 (Gradually cooled)

No evidence of induced cracking in the ceramic body is observed in all cross-sectioned joints.

7. Solder Alloy: 93.5Pb/5Sn/1.5Ag

7. A. 93.5Pb/5Sn/1.5Ag Sample 1 (Force-cooled)

No evidence of induced cracking in the ceramic body is observed in all cross-sectioned joints.

7. B. 93.5Pb/5Sn/1.5Ag Sample 2 (Gradually cooled)

No evidence of induced cracking in the ceramic body is observed in all cross-sectioned joints.

Summary of Results

| Serial number | Alloy varieties | Cooling method | Defect rate (%) without temperature shock | Defect rate (%) after 100 temperature shocks from −55° C. to 125° C. | Defect rate (%) after 20 temperature shocks from −55° C. to 125° C. |
|---|---|---|---|---|---|
| 1 | 62Sn/36Pb/2Ag | Force | 0 | 0 | 0 |
| | | Gradually | 0 | 0 | 0 |
| 2 | 60Sn/40Pb | Force | 0 | 0 | 0 |
| | | Gradually | 0 | 0 | 0 |
| 3 | 99.3Sn/0.7Cu | Force | 0 | 0 | 0 |
| | | Gradually | 0 | 0 | 0 |
| 4 | 95.5Sn/3.8Ag/0.7Cu | Force | 0 | 0 | 0 |
| | | Gradually | 0 | 0 | 0 |
| 5 | 50Pb/50In | Force | 0 | 0 | 0 |
| | | Gradually | 0 | 0 | 0 |
| 6 | 95Pb/5In | Force | 0 | 0 | 0 |
| | | Gradually | 0 | 0 | 0 |
| 7 | 93.5Pb/5Sn/1.5Ag | Force | 0 | 0 | 0 |
| | | Gradually | 0 | 0 | 0 |

Based on the experiments conducted, it can be concluded that the use of common solder alloys in the soldering of disk-shaped multilayer ceramic capacitors with the structure of the present application does not result in long-bow cracks, effectively solving the problem of soldering cracking. Additionally, the preference for lead-free solder alloys is more environmentally friendly compared to the use of high-lead solder alloys.

The first controlled expansion alloy tube is soldered to the inner hole of the disk-shaped multilayer ceramic capacitor, or both the inner hole and outer ring, to enhance the stress resistance capability of the disk-shaped multilayer capacitor. This allows for the use of solder materials in the production of multilayer ceramic capacitors that are not limited to highly ductile materials containing lead. Even in cases where solder materials with poor ductility are used, the capacitors can withstand multiple high-temperature and low-temperature rapid temperature changes without failure, resulting in highly reliable multilayer ceramic capacitors. By incorporating the first controlled expansion alloy tube, excessive stress directly transferred to the ceramic dielectric material is avoided, and the interval form effectively reduces the direct transfer of stress during thermal expansion and contraction. Additionally, the inclusion of the first controlled expansion alloy tube reduces the amount of solder used and the demand for highly ductile solder materials. The first controlled expansion alloy tube has a similar expansion coefficient as the ceramic, thereby preventing crack formation in harsh environments with alternating hot and cold temperatures and improving the reliability of the capacitors.

The above description is only the preferred embodiment of the present application and should not be construed as limiting the scope of the application. Various modifications and changes can be made by those skilled in the art within the spirit and principles of the present application. Any modifications, equivalent substitutions, improvements, etc., made within the spirit and principles of the present application should be included within the scope of the application.

The invention claimed is:

1. A highly reliable multilayer ceramic through-hole capacitor, comprising a multilayer ceramic through-hole capacitor body, the multilayer ceramic through-hole capacitor body having at least one inner hole;

a guide pin being provided inside the inner hole, wherein a first controlled expansion alloy tube is connected to a sidewall of the inner hole;

the first controlled expansion alloy tube needs is subjected to undergo annealing and surface plating treatment;

wherein the inner hole is a central hole;

wherein the multilayer ceramic through-hole capacitor body is a disk-shaped multilayer ceramic through-hole capacitor, with the central hole for inserting the first controlled expansion alloy tube; and a second controlled expansion alloy tube is welded to a periphery of the multilayer ceramic through-hole capacitor body using solder.

2. The highly reliable multilayer ceramic through-hole capacitor according to claim 1, wherein the guide pin is inserted in the first controlled expansion alloy tube;

the guide pin is fixed to the first controlled expansion alloy tube using lead-free solder; the first controlled expansion alloy tube is fixed to the inner hole using lead-free solder or directly sintered.

3. The highly reliable multilayer ceramic through-hole capacitor according to claim 1, wherein the first controlled expansion alloy tube is a seamless tube; two ends of the first controlled expansion alloy tube extend out of the inner hole of the multilayer ceramic through-hole capacitor body.

4. The highly reliable multilayer ceramic through-hole capacitor according to claim 1, wherein the surface plating of the first controlled expansion alloy tube is a single plating layer of copper, nickel, silver, gold, tin, or tin-lead, or a composite plating layer consisting of several of these plating layers.

5. A method for manufacturing the highly reliable multilayer ceramic through-hole capacitor according to claim 1, comprising the following steps:

S1: selecting the controlled expansion alloy tube with a diameter slightly smaller than the inner hole; the controlled expansion alloy tube is seamless;

S2: cutting the controlled expansion alloy tube into a length greater than a thickness of the multilayer ceramic through-hole capacitor body;

S3: removing burrs from the cut controlled expansion alloy tube;

S4: vacuum annealing the deburred controlled expansion alloy tube to eliminate mechanical processing stress and work hardening;

S5: electroplating the annealed controlled expansion alloy tube on the inner and outer surfaces to prepare the first controlled expansion alloy tube;

S6: installing the first controlled expansion alloy tube through a fixture into the inner hole of the multilayer ceramic through-hole capacitor body, the guide pin is inserted into the inner hole;

the multilayer ceramic through-hole capacitor body is a disk-shaped multilayer ceramic through- hole capacitor or a planar array capacitor;

S7: adding solder between the guide pin and the first controlled expansion alloy tube, and between the first controlled expansion alloy tube and the inner hole for welding; and S8: cleaning and drying the soldered product, and performing sealing and curing on products with a metal shell.

6. The method for manufacturing the highly reliable multilayer ceramic through-hole capacitor according to claim 5, wherein the vacuum annealing process involves heating the material to 900° C.±50° C. in a hydrogen atmosphere, holding it for 1-2 hours, and cooling to below 200° C. at a rate not exceeding 5° C./min before furnace removal.

7. The highly reliable multilayer ceramic through-hole capacitor according to claim 1, wherein the first controlled expansion alloy tube is made of one of iron-nickel, iron-nickel-cobalt, and iron-nickel-chromium alloys.

8. The highly reliable multilayer ceramic through-hole capacitor according to claim 1, wherein the second controlled expansion alloy tube is provided around the periphery of the disk-shaped multilayer ceramic through-hole capacitor, with its size matching that of the disk-shaped multilayer ceramic through-hole capacitor; the second controlled expansion alloy tube is made of one of iron-nickel, iron-nickel-cobalt, and iron-nickel-chromium alloys.

9. The highly reliable multilayer ceramic through-hole capacitor according to claim 1, wherein the multilayer ceramic through-hole capacitor is positioned inside a metal shell and sealed to form an anti-electromagnetic interference filter.

10. A method for manufacturing the highly reliable multilayer ceramic through-hole capacitor according to claim 2, comprising the following steps:

S1: selecting the controlled expansion alloy tube with a diameter slightly smaller than the inner hole; the controlled expansion alloy tube is seamless;

S2: cutting the controlled expansion alloy tube into a length equivalent to the greater than a thickness of the multilayer ceramic through-hole capacitor body;

S3: removing burrs from the cut controlled expansion alloy tube;

S4: vacuum annealing the deburred controlled expansion alloy tube to eliminate mechanical processing stress and work hardening;

S5: electroplating the annealed controlled expansion alloy tube on the inner and outer surfaces to prepare the first controlled expansion alloy tube;

S6: installing the first controlled expansion alloy tube through a fixture into the inner hole of the multilayer ceramic through-hole capacitor body, the guide pin is inserted into the inner hole;

the multilayer ceramic through-hole capacitor body is a disk-shaped multilayer ceramic through- hole capacitor or a planar array capacitor;

S7: adding solder between the guide pin and the first controlled expansion alloy tube, and between the first controlled expansion alloy tube and the inner hole for welding; and S8: cleaning and drying the soldered product, and performing sealing and curing on products with a metal shell.

11. A method for manufacturing the highly reliable multilayer ceramic through-hole capacitor according to claim 3, comprising the following steps:

S1: selecting the controlled expansion alloy tube with a diameter slightly smaller than the inner hole; the controlled expansion alloy tube is seamless;

S2: cutting the controlled expansion alloy tube into a length greater than a thickness of the multilayer ceramic through-hole capacitor body;

S3: removing burrs from the cut controlled expansion alloy tube;

S4: vacuum annealing the deburred controlled expansion alloy tube to eliminate mechanical processing stress and work hardening;

S5: electroplating the annealed controlled expansion alloy tube on the inner and outer surfaces to prepare the first controlled expansion alloy tube;

S6: installing the first controlled expansion alloy tube through a fixture into the inner hole of the multilayer ceramic through-hole capacitor body, the guide pin is inserted into the inner hole;

the multilayer ceramic through-hole capacitor body is a disk-shaped multilayer ceramic through- hole capacitor or a planar array capacitor;

S7: adding solder between the guide pin and the first controlled expansion alloy tube, and between the first controlled expansion alloy tube and the inner hole for welding; and S8: cleaning and drying the soldered product, and performing sealing and curing on products with a metal shell.

12. A method for manufacturing the highly reliable multilayer ceramic through-hole capacitor according to claim 4, comprising the following steps:

S1: selecting the controlled expansion alloy tube with a diameter slightly smaller than the inner hole; the controlled expansion alloy tube is seamless;

S2: cutting the controlled expansion alloy tube into a length greater than a thickness of the multilayer ceramic through-hole capacitor body;

S3: removing burrs from the cut controlled expansion alloy tube;

S4: vacuum annealing the deburred controlled expansion alloy tube to eliminate mechanical processing stress and work hardening;

S5: electroplating the annealed controlled expansion alloy tube on the inner and outer surfaces to prepare the first controlled expansion alloy tube;

S6: installing the first controlled expansion alloy tube through a fixture into the inner hole of the multilayer ceramic through-hole capacitor body, the guide pin is inserted into the inner hole;

the multilayer ceramic through-hole capacitor body is a disk-shaped multilayer ceramic through- hole capacitor or a planar array capacitor;

S7: adding solder between the guide pin and the first controlled expansion alloy tube, and between the first controlled expansion alloy tube and the inner hole for welding; and S8: cleaning and drying the soldered product, and performing sealing and curing on products with a metal shell.

13. The method for manufacturing the highly reliable multilayer ceramic through-hole capacitor according to claim 10, wherein the vacuum annealing process involves heating the material to 900° C.±50° C. in a hydrogen atmosphere, holding it for 1-2 hours, and cooling to below 200° C. at a rate not exceeding 5° C./min before furnace removal.

14. The method for manufacturing the highly reliable multilayer ceramic through-hole capacitor according to claim 11, wherein the vacuum annealing process involves heating the material to 900° C.±50° C. in a hydrogen atmosphere, holding it for 1-2 hours, and cooling to below 200° C. at a rate not exceeding 5° C./min before furnace removal.

15. The method for manufacturing the highly reliable multilayer ceramic through-hole capacitor according to claim 12, wherein the vacuum annealing process involves heating the material to 900° C.±50° C. in a hydrogen atmosphere, holding it for 1-2 hours, and cooling to below 200° C. at a rate not exceeding 5° C./min before furnace removal.

16. The highly reliable multilayer ceramic through-hole capacitor according to claim 2, wherein the first controlled expansion alloy tube is made of one of iron- nickel, iron-nickel-cobalt, and iron-nickel-chromium alloys.

* * * * *